United States Patent
Menheere

(10) Patent No.: US 11,674,441 B2
(45) Date of Patent: Jun. 13, 2023

(54) TURBOFAN ENGINE, COOLING SYSTEM AND METHOD OF COOLING AN ELECTRIC MACHINE

(71) Applicant: PRATT & WHITNEY CANADA CORP., Longueuil (CA)

(72) Inventor: David H. Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 35 days.

(21) Appl. No.: 17/349,369

(22) Filed: Jun. 16, 2021

(65) Prior Publication Data
US 2022/0403782 A1 Dec. 22, 2022

(51) Int. Cl.
*F02C 7/16* (2006.01)
*F04D 19/00* (2006.01)
*F04D 29/58* (2006.01)

(52) U.S. Cl.
CPC .............. *F02C 7/16* (2013.01); *F04D 19/002* (2013.01); *F04D 29/584* (2013.01); *F05D 2220/323* (2013.01); *F05D 2260/232* (2013.01)

(58) Field of Classification Search
CPC ........ F02C 7/16; F04D 19/002; F04D 29/584; F05D 2220/323; F05D 2260/232; B64D 2027/026; F01D 25/12; F01D 15/10
See application file for complete search history.

(56) References Cited

U.S. PATENT DOCUMENTS

| | | | |
|---|---|---|---|
| 10,784,750 B2 | 9/2020 | Gerstler et al. | |
| 10,801,410 B2 | 10/2020 | Roberge | |
| 2018/0050807 A1 | 2/2018 | Kupiszewski et al. | |
| 2018/0051702 A1* | 2/2018 | Kupiszewski | F02C 3/04 |
| 2018/0156120 A1 | 6/2018 | Menheere et al. | |
| 2019/0014687 A1* | 1/2019 | Snyder | H05K 7/209 |
| 2019/0085715 A1* | 3/2019 | van der Merwe | F01D 15/10 |
| 2020/0039654 A1 | 2/2020 | Smith et al. | |

FOREIGN PATENT DOCUMENTS

WO 2021/014667 A1 1/2021

\* cited by examiner

*Primary Examiner* — Courtney D Heinle
*Assistant Examiner* — Andrew Thanh Bui
(74) *Attorney, Agent, or Firm* — Norton Rose Fulbright Canada LLP

(57) ABSTRACT

The gas turbine engine can have an air mover configured for generating a flow of air around a rotation axis; a surface extending around the rotation axis delimiting a passage for the flow of air downstream of the air mover; an electric machine disposed within the passage and coupled to the air mover; a coolant circuit having: an evaporator circumferentially disposed around at least part of the electric machine and in thermal communication therewith; a condenser having a surface cooler circumferentially disposed at least partially around the surface and in thermal communication therewith; a first conduit fluidly connecting an upper region of the evaporator to an upper region of the condenser; and a second conduit fluidly connecting a lower region of the condenser to a lower region of the evaporator; and a coolant fluid in the coolant circuit.

16 Claims, 4 Drawing Sheets

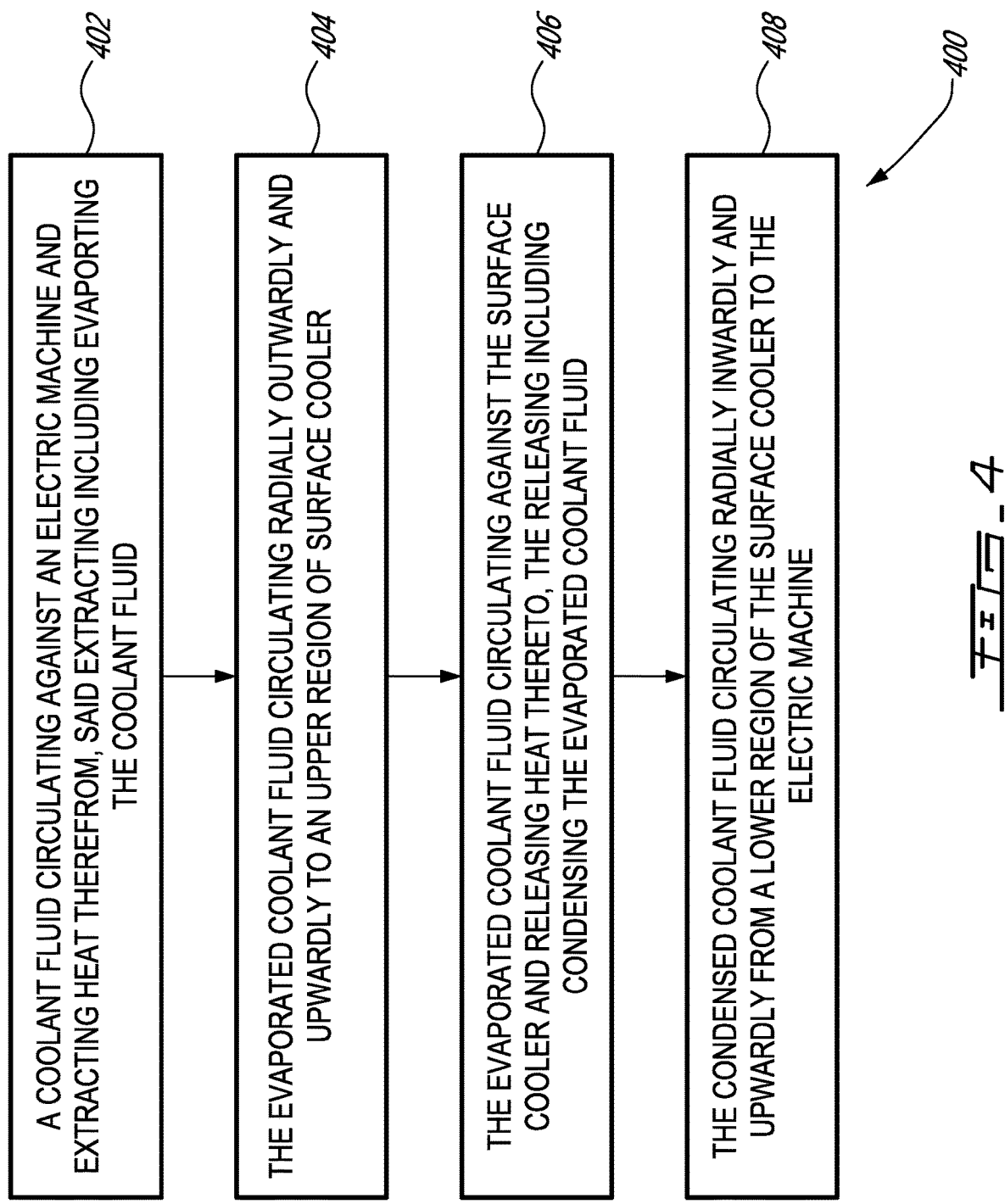

TURBOFAN ENGINE, COOLING SYSTEM AND METHOD OF COOLING AN ELECTRIC MACHINE

TECHNICAL FIELD

The application relates generally to a gas turbine engine for an aircraft and, more particularly, to a cooling system thereof.

BACKGROUND OF THE ART

Fuel economy has always been a concern in aircraft engine design, and even more so in an era where reduction of carbon emissions has become a priority. Incorporating a hybrid heat/electric functionality to aircraft engines is a way to further optimize carbon fuel usage, but poses a number of challenges. For instance, in some embodiments, it can be desired to connect an electric machine directly to a low pressure/power shaft of a heat engine core, motivating the positioning of the electric machine in the exhaust/tail cone area of the aircraft engine. The exhaust/tail cone area is an area where temperatures can rise significantly during operation of the aircraft engine, and the electric machine generates temperature of its own during operation. Higher temperatures impose design constraints on the choice of materials, often leading to higher costs, and can also affect performance and durability of components. There thus remained room for improvement.

SUMMARY

In an aspect, there is provided a gas turbine engine comprising: an air mover configured for generating a flow of air around a rotation axis; a surface extending around the rotation axis delimiting a passage for the flow of air downstream of the air mover; an electric machine disposed within the passage and coupled to the air mover; a coolant circuit having: an evaporator circumferentially disposed around at least part of the electric machine and in thermal communication therewith; a condenser having a surface cooler circumferentially disposed at least partially around the surface and in thermal communication therewith; a first conduit fluidly connecting an upper region of the evaporator to an upper region of the condenser; and a second conduit fluidly connecting a lower region of the condenser to a lower region of the evaporator; and a coolant fluid in the coolant circuit.

In another aspect, there is provided a method of cooling an electric machine of a gas turbine engine having an air mover configured for generating a flow of air around a rotation axis, a surface extending around the rotation axis delimiting a passage for the flow of air downstream of the air mover, and an electric machine disposed within the surface and coupled to the air mover, the method comprising: a coolant fluid circulating against the electric machine and extracting heat therefrom, said extracting including evaporating the coolant fluid; the evaporated coolant fluid circulating radially outwardly and upwardly to an upper region of the surface cooler; the evaporated coolant fluid circulating circumferentially along the surface cooler and releasing the extracted heat thereto, said releasing including condensing the evaporated coolant fluid; and the condensed coolant fluid circulating radially inwardly and upwardly from a lower region of the surface cooler to the electric machine.

In a further aspect, there is provided a cooling system for an engine having an air mover configured for generating a flow of air around a rotation axis, a surface extending around the rotation axis delimiting a passage for the flow of air downstream of the air mover, and an electric machine disposed within the surface and coupled to the air mover, the cooling system comprising: a coolant circuit having: an evaporator circumferentially disposed around at least part of the electric machine and in thermal communication therewith; a condenser having a surface cooler circumferentially disposed around at least part of the bypass duct and in thermal communication therewith; a first conduit fluidly connecting an upper region of the evaporator to an upper region of the condenser; and a second conduit fluidly connecting a lower region of the condenser to a lower region of the evaporator; and a coolant fluid in the coolant circuit.

DESCRIPTION OF THE DRAWINGS

Reference is now made to the accompanying figures in which:

FIG. 4 is a flow chart of an example of a method of cooling an electric machine of a turbofan engine, in accordance with one or more embodiments.

DETAILED DESCRIPTION

Figure 1:
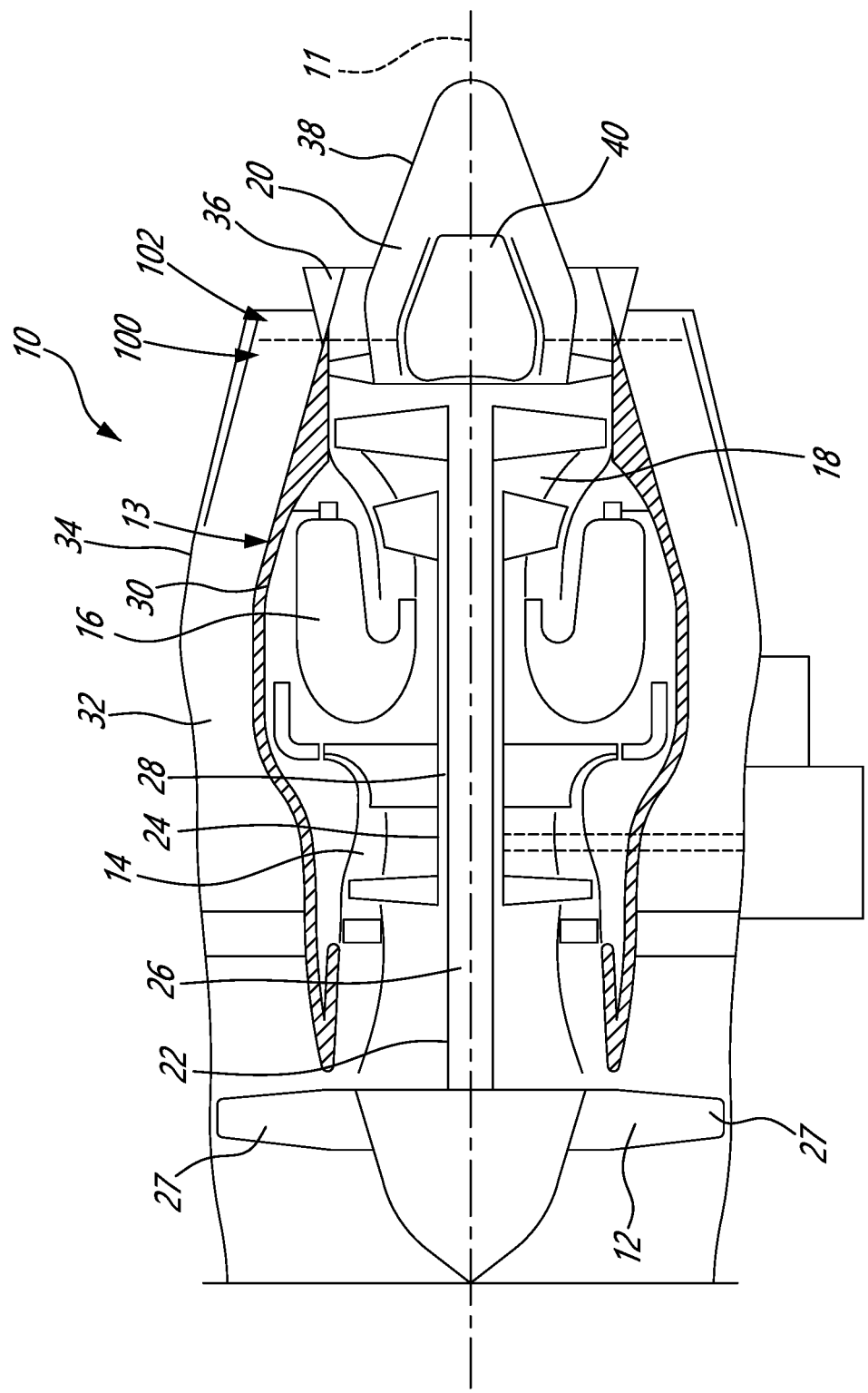
FIG. 1 is a schematic cross-sectional view of a turbofan engine having cooling system for cooling an electric machine, in accordance with one or more embodiments.

FIG. 1 illustrates a turbofan engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, a turbine section 18 for extracting energy from the combustion gases, and an exhaust section 20 where the hot combustion gases are expelled.

It is noted that the terms "radial", "annular" and "circumferential" used throughout the description and appended claims are defined with respect to the engine axis 11. It is further noted that the terms "upper" and "lower" used throughout the description and appended claims are defined with respect to gravity when the aircraft is in typical cruising conditions.

In this example, the turbofan engine 10 has an engine core 13 including a two spool arrangement provided by first and second shafts 22 and 24 that rotate about the engine axis 11. The first shaft 22 corresponds to a low pressure spool 26, and the second shaft 16 corresponds to a high pressure spool 24. The first shaft 22 is coupled to a low pressure compressor section and a low pressure turbine section. The second shaft 24 is coupled to a high pressure compressor section and a high pressure turbine section. The shafts 22 and 24 are supported within a housing 30 of the engine core 13 for rotation and typically include multiple portions secured to one another, as is known in the art.

As shown, the turbofan engine 10 generally has a bypass duct 32 forming a bypass passage extending annularly around the engine axis 11. The bypass passage extends rearwardly from the fan 12 and around the engine core 13 towards the exhaust section 20. The fan 12 has multiple blades 27 and is typically coupled to the first shaft 22.

As depicted, a nozzle 36 is disposed in the exhaust section 20 downstream from the low pressure turbine section 18, and a tail cone 38 is arranged within the nozzle 36. In this example, an electric machine 40 is disposed in the exhaust section 20 and coupled to a rotary shaft. The electric machine 40 may be directly or indirectly coupled to the rotary shaft. In some embodiments, a clutch can be used in the coupling. In this specific example, the electric machine 40 is arranged within the tail cone 39 and driven by the first shaft 22. The electric machine 40 can provide a hybrid heat/electric functionality to the turbofan engine 10. In a first mode of operation, the electric machine 40 can be driven by the first shaft 22 to generate electrical power for use by other components of the turbofan engine 10 or aircraft. In a second mode of operating, the electric machine 40 can draw external electrical power from the remainder of the turbofan engine 10 or aircraft to drive the first shaft 22 to further propulsion. As the exhaust section 20 is an area where temperatures can rise significantly during operation of the turbofan engine 10, and the electric machine 40 typically generates heat of its own during operation in either mode of operation, it is desirable to cool the electric machine 40 from the combustion gases exiting the nozzle 36.

As shown, the turbofan engine 10 is provided with a cooling system 100 having a coolant circuit 102 extracting heat from the electric machine 40 and releasing the extracted heat in the bypass passage. More specifically, and now referring to FIG. 2, the coolant system 100 has a coolant circuit 102 having an evaporator 104 circumferentially disposed around at least part of the electric machine 40 and in thermal communication with the electric machine 40. The coolant circuit 102 also has a condenser 106 which has a surface cooler 108 circumferentially disposed around at least part of the bypass passage or duct 34 and in thermal communication with the bypass duct 34. As illustrated, a first conduit 110 fluidly connecting an upper region 104a of the evaporator to an upper region 106a of the condenser 106 is provided. A second conduit 112 is also provided to fluidly connect a lower region 106b of the condenser 106 to a lower region 104b of the evaporator 104. Upon heating of the electric machine 40, or more specifically heating of oil 50 contained in the electric machine 40 or from the hot combustion gases flowing annularly around the engine core, a coolant fluid 120 in the coolant circuit 102 can conveniently extract heat from the electric machine 40 and release the extracted heat in the bypass duct 34. More specifically, the coolant fluid 120 circulating in the evaporator 104, against the electric machine 40, extracts heat from the electric machine 40 which contributes to evaporating the coolant fluid 120. The evaporated coolant fluid 120 then circulates radially outwardly and upwardly to the upper region 106a of the condenser 106 via the first conduit 110. The evaporated coolant fluid 120 circulates circumferentially along the surface cooler 106 and releases the extracted heat which results in condensing of the evaporated coolant fluid 120. The condensed coolant fluid 120 then circulates radially inwardly and upwardly from the lower region 112 of the condenser 106 towards the electric machine 40 via the second conduit 112 where the cooling cycle described immediately above is repeated. Such a phase-change coolant cycle can be performed repetitively and simultaneously thereby cooling the electric machine 40 during use.

It is noted that as some portion of the coolant fluid 120 is evaporated in the evaporator 104, some other portion of the coolant fluid 120 is condensed in the condenser 106 thereby provide a continuous and self-circulating cooling operation to the cooling circuit 102. In some embodiments, the coolant fluid 120 circulating in the coolant circuit 102 allows a set temperature to be maintained without pumps and minimum maintenance. The coolant fluid 120 sealingly enclosed within the coolant circuit 102 self-circulates in a flow direction which is illustrated by the arrows A of FIG. 2 as soon as the heat generated by the electric machine 40 is sufficient to evaporate, or equivalently boil, the coolant fluid 120 into an evaporated fluid or vapor portion. Further, also required for self-circulation in the flow direction is the heat release potential of the condenser 106 which is preferably sufficient to condense all of the evaporated fluid into a condensed cooling fluid or liquid portion. In this way, the cooling fluid passively boils, flows and condenses repetitively in a number of cycles to transfer heat from a high temperature region, proximate the electric machine 40, to a lower temperature region, proximate the bypass duct 34. Doing so, the coolant fluid 120 undergoes a large volume change when it transforms from liquid to vapour phase, and subsequently back from vapour to liquid. The coolant system 100 takes advantage of the two-phase heat transfer available from the coolant fluid 120 in the coolant circuit 102, which coolant fluid 120 is preferably water in this embodiment, however any other suitable working fluid may be used. Water can be preferred in some embodiments as it has convenient boiling and condensation points, and has relatively high thermal conductivity relative to air and other conveniently available liquids. Water is also inexpensive and present no environmental hazards. In some embodiments, purified water can be preferred as purified water exhibits a high thermal conductivity and good cooling properties, has a low electrical conductivity when free of ions and is non-flammable, a property of significant importance especially as the cooling system is operated proximate hot combustion gases. Any other dielectric liquid can also be used in some other embodiments. Examples of such dielectric liquids can include, but are not limited to, purified water, mineral oil, silicone oil, Fluorinert™ FC-72, and the like. While these dielectric liquids can insulate the electric machine during operation, such dielectric liquids may also in some instances prevent or rapidly quench electric discharges that may occur proximate the electric machine.

In some embodiments, the coolant circuit 102 has a pump 140 in fluid communication with the coolant circuit 102 for pumping the coolant fluid 120 around the coolant circuit 102, thereby forcing the circulation. As emphasized with dashed lines, the pump 140 is optional as it can be omitted in some embodiments.

The surface cooler 108 may be annular such as illustrated. However, the surface cooler can be semi-annular as well, as long as it somehow partially or wholly surrounds the electric machine 40 along its circumference. When the surface cooler 108 is annular, the surface cooler 108 defines coolant paths 142 which are laterally opposite to one another relative the first and second conduits 160 and 162. The coolant paths 142 extend from the upper region 106a of the condenser 106 to the lower region 106b of the condenser 106 and extend circumferentially on respective sides of the bypass duct 34. In some embodiments, the surface cooler 106 is supported on an outer bypass duct wall or on an inner bypass duct wall. An example of such a surface cooler is described in Applicant's U.S. Pat. No. 7,377,100, which is hereby incorporated by reference in this disclosure. A fluid fill/gauge can be located for easy access on the surface cooler 108 in some embodiments.

Figure 2:
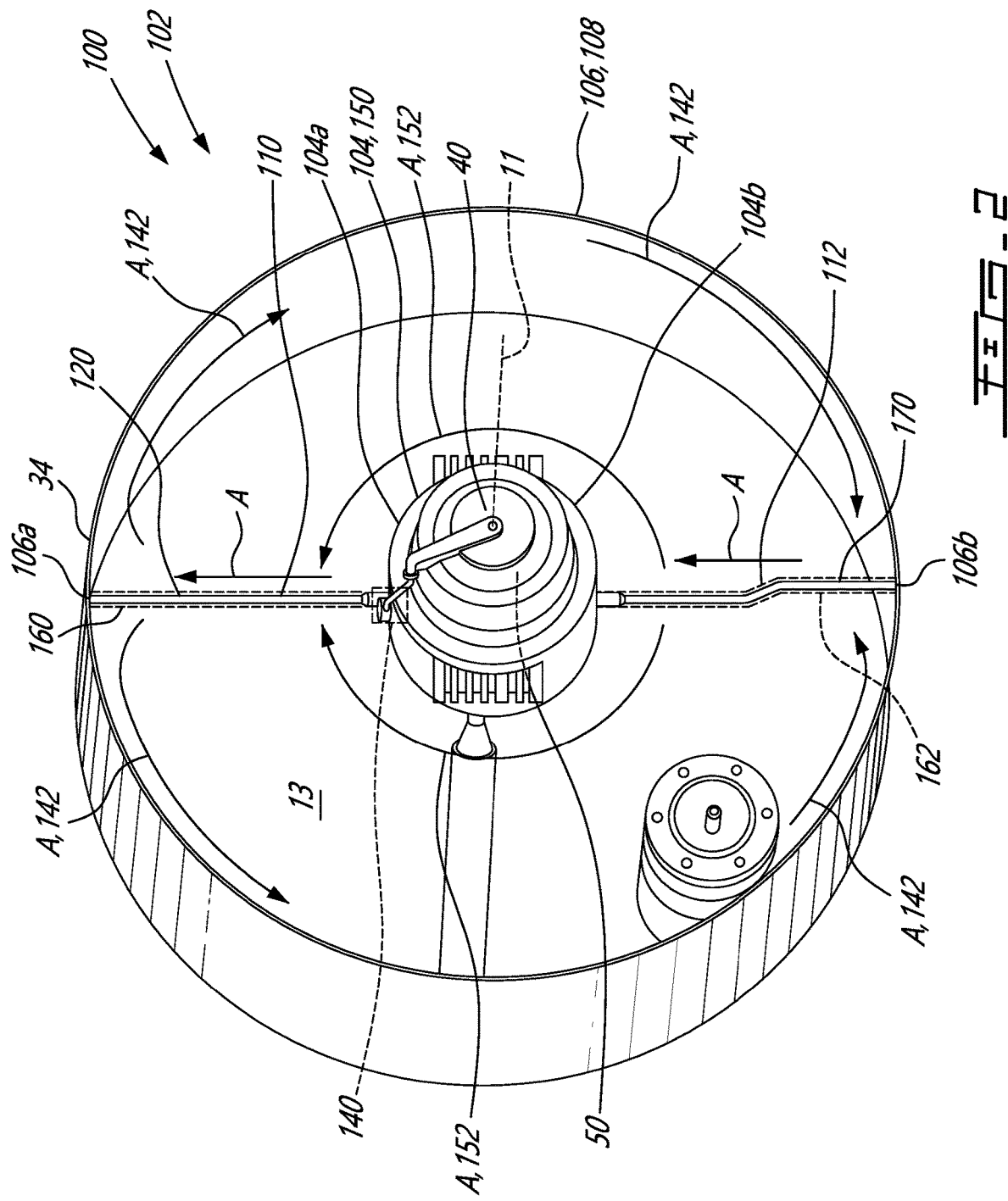
FIG. 2 is an oblique view of the cooling system of FIG. 1, showing a coolant circuit having an evaporator, a condenser and conduits inside which a coolant fluid circulates, in accordance with one or more embodiments.

Still referring to FIG. 2, the evaporator 104 has a surface heater 150 circumferentially disposed around at least part of the electric machine 40 and in thermal communication with the electric machine 40. The surface heater 150 may be annular such as illustrated. However, the surface heater 150 can be semi-annular as well, as long as it somehow partially or wholly surrounds the electric machine 40 along its circumference. As shown, the surface heater 150 defines heating paths 152 which are laterally opposite to one another relative the first and second conduits 160 and 162. The heating paths 152 extend from the lower region 104b of the evaporator 104 to the upper region 104a of the evaporator 104 and extend circumferentially on respective sides of the electric machine 40. As depicted in this specific embodiment, the surface cooler 108 and the surface heater 150 have an axis coinciding with one another, and also coinciding with the engine axis 11. However, in some other embodiments, the axes of the surface cooler 108 and surface heater 150 may not coincide with one another. The surface cooler and the surface heater can extend circumferentially relative the engine axis 11.

Figure 3:
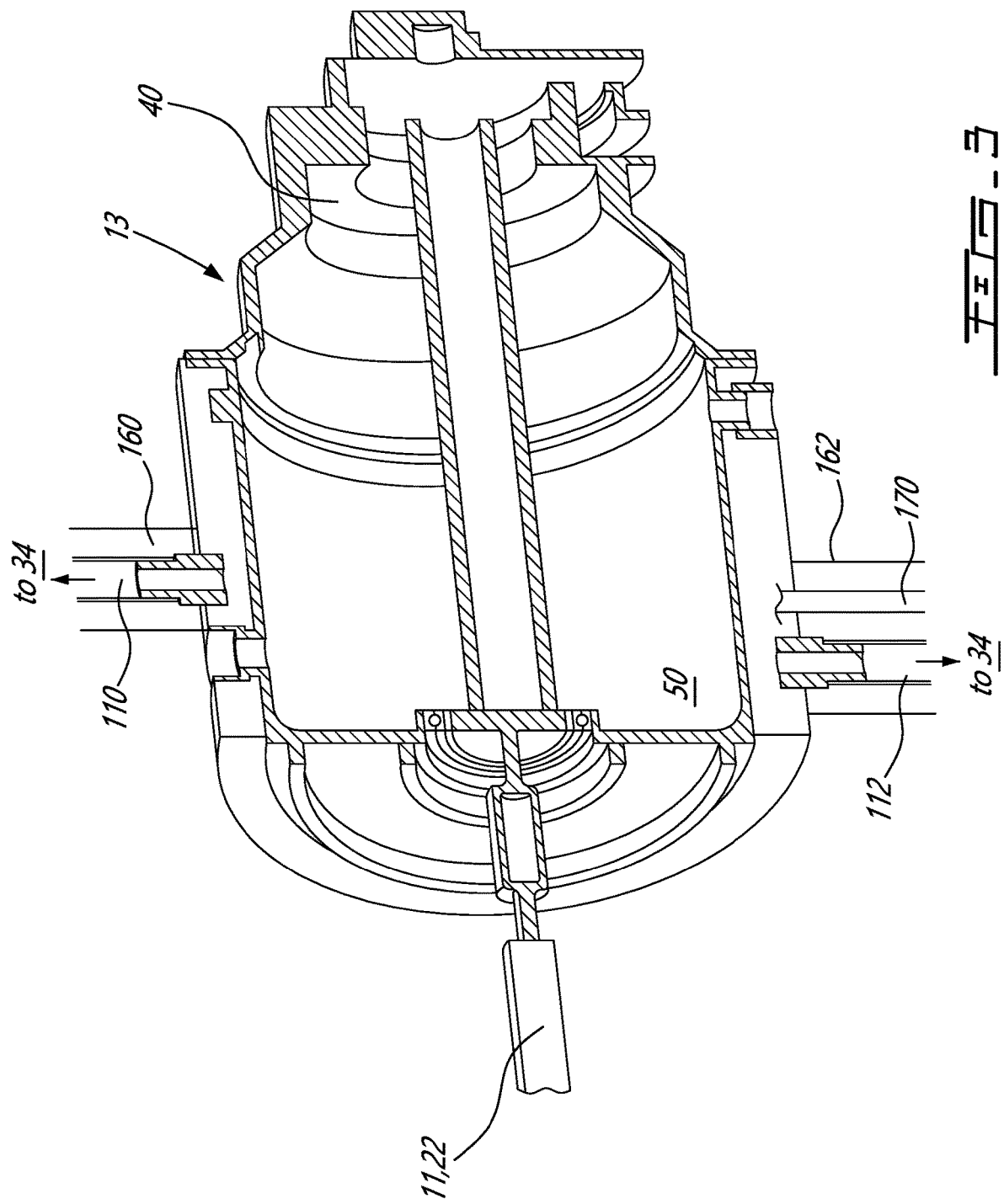
FIG. 3 is an oblique cross-sectional view of the evaporator of FIG. 2, in accordance with one or more embodiments.

Referring now to FIG. 3, the turbofan engine may have at least first and second struts 160 and 162 radially extending between the engine core 13 and the bypass duct 34. Preferably, the first and second conduits 110 and 112 run along a respective one of the first and second struts 160 and 162. In embodiments where the first and second struts 160 and 162 are hollow, the first and second conduits 110 and 112 may be disposed within a corresponding one of the first and second struts 160 and 162. In this way, the first and second conduits 110 and 112 may be relatively aerodynamically hidden from the flow of hot combustion gases, which may not be as much detrimental to the efficiency of the turbofan engine. It is intended that a power cable 170 electrically coupling the electric machine 40 may be provided. Power may be generated by the electric machine 40 in the first mode of operation whereas power may be brought to the electric machine 40 in the second mode of operation. In either mode of operation, the power cable 170 may generate heat by itself. In such embodiments, it may be desirable to dispose the power cable 170 alongside the second conduit 112, the one carrying the condensed, cold coolant liquid, within or alongside the second strut 162. In such embodiments, the condensed coolant fluid 120 can extract heat from the power cable 170 as the condensed coolant fluid 120 circulates radially inwardly and upwardly from the lower region 106b of the surface cooler 106 to the electric machine 40. In an alternate embodiment, the power cable 170 can extend within the corresponding one of the first and second conduits 110 and 112.

FIG. 4 shows a method of cooling an electric machine of a turbofan engine.

As shown, as per step 402, a coolant fluid circulates against the electric machine and extracts heat from the electric machine. The extracting includes evaporating the coolant fluid.

A step 404, the evaporated coolant fluid circulates radially outwardly and upwardly to an upper region of the surface cooler.

At step 406, the evaporated coolant fluid circulates circumferentially along the surface cooler and releases the extracted heat thereto. The releasing includes condensing the evaporated coolant fluid.

At step 408, the condensed coolant fluid circulates radially inwardly and upwardly from a lower region of the surface cooler to the electric machine.

In some embodiments, the steps of circulating includes actively driving the circulating using at least a pump. The pump can be in fluid communication with the condenser, the evaporator, the first and second conduits, or a combination thereof, depending on the embodiment. The pump can be powered by the electric machine in some embodiments. However, in some other embodiments, the pump can be powered using a power source external to the electric machine. The pump can be omitted in at least some embodiments. As discussed above, the coolant fluid can be an dielectric material electrically insulating the electric machine during use.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, in the example presented and illustrated above, the condenser is in thermal contact with a bypass duct, and configured for thermal exchange with an annular flow of air circulating in a bypass passage formed between the bypass duct and the engine core, where the air mover is a fan of the turbofan and the bypass duct is radially external to the annular flow of air. In an alternate embodiment, the air mover can be a propeller generating an annular flow of air around a nacelle of the engine, and the condenser can be in thermal contact with the nacelle, and configured for thermal exchange with the annular flow of air incoming around the nacelle from the propeller, in which case the condenser can be radially internal to the flow of air. Indeed, a nacelle can form a surface extending around the rotation axis of a propeller and which is designed to facilitate the flow of air around the engine, and preserve its energy for propulsion, in a way similar to how a bypass duct extends around the rotation axis of a fan and is designed to facilitate the flow of air around the core engine and preserve its energy for propulsion. The gas turbine engine can thus be a turboprop, an electric engine, or a piston engine, for example. Yet further modifications could be implemented by a person of ordinary skill in the art in view of the present disclosure, which modifications would be within the scope of the present technology.

The invention claimed is:

1. A gas turbine engine comprising:
an air mover configured for generating a flow of air around a rotation axis;
a surface extending around the rotation axis delimiting a passage for the flow of air downstream of the air mover;
an electric machine disposed within the passage and coupled to the air mover;
a coolant circuit having:
an evaporator circumferentially disposed around at least part of the electric machine and in thermal communication therewith, the evaporator having a surface heater disposed at least partially around the electric machine and in thermal communication therewith, the surface heater defining heating paths laterally opposite to one another, extending from the lower region of the evaporator to the upper region of the evaporator and extending at least partially circumferentially on respective sides of the electric machine;
a condenser having a surface cooler circumferentially disposed at least partially around the surface and in thermal communication therewith;

a first conduit fluidly connecting an upper region of the evaporator to an upper region of the condenser; and a second conduit fluidly connecting a lower region of the condenser to a lower region of the evaporator; and a coolant fluid in the coolant circuit.

2. The gas turbine engine of claim 1 wherein the coolant fluid is a dielectric material.

3. The gas turbine engine of claim 1 further comprising a bypass duct annularly extending around the passage, the passage extending rearwardly from a fan and around an engine core, the engine core having an exhaust section and at least one rotary shaft disposed along the rotation axis, the electric machine being disposed in the exhaust section and being coupled to the rotary shaft.

4. The gas turbine engine of claim 3 further comprising at least first and second struts radially extending between the engine core and the bypass duct, the first and second conduits running along a respective one of the first and second struts.

5. The gas turbine engine of claim 4 further comprising a power cable electrically coupling the electric machine to an electric device external to the engine core, the power cable running along at least one of the first and second struts and being in thermal communication with a corresponding one of the first and second conduits.

6. The gas turbine engine of claim 5 wherein the power cable runs along the second conduit and is in thermal communication therewith.

7. The gas turbine engine of claim 1 wherein the surface cooler and the surface heater extend circumferentially relative to the rotation axis.

8. The gas turbine engine of claim 1 wherein the surface cooler defines coolant paths laterally opposite to one another relative the first and second conduits, extending from the upper region of the condenser to the lower region of the condenser and extending at least partially circumferentially on respective sides of the surface.

9. The gas turbine engine of claim 1 wherein the coolant circuit has a pump in fluid communication therewith, the pump being configured for pumping the coolant fluid around the coolant circuit.

10. A method of cooling an electric machine of a gas turbine engine having an air mover configured for generating a flow of air around a rotation axis, a surface extending around the rotation axis delimiting a passage for the flow of air downstream of the air mover, and an electric machine disposed within the surface and coupled to the air mover, the method comprising:

a coolant fluid circulating against the electric machine and extracting heat therefrom, said extracting including evaporating the coolant fluid, said circulating including the coolant fluid circulating within an evaporator having a surface heater disposed at least partially around the electric machine and in thermal communication therewith, the surface heater defining heating paths opposite to one another, extending from a lower region of the evaporator to an upper region of the evaporator and circumferentially disposed around at least part of corresponding sides of the electric machine;

the evaporated coolant fluid circulating radially outwardly and upwardly to an upper region of the surface cooler;

the evaporated coolant fluid circulating circumferentially along the surface cooler and releasing the extracted heat thereto, said releasing including condensing the evaporated coolant fluid; and the condensed coolant fluid circulating radially inwardly and upwardly from a lower region of the surface cooler to the electric machine.

11. The method of claim 10 wherein said circulating includes actively driving the circulating using a pump.

12. The method of claim 10 wherein said coolant fluid is a dielectric material electrically insulating the electric machine.

13. The method of claim 10 wherein the condensed coolant fluid extracting heat from a power cable electrically coupling the electric machine to an external electric device as the condensed coolant fluid circulates radially inwardly and upwardly from the lower region of the surface cooler to the electric machine.

14. A cooling system for an engine having an air mover configured for generating a flow of air around a rotation axis, a surface extending around the rotation axis delimiting a passage for the flow of air downstream of the air mover, and an electric machine disposed within the surface and coupled to the air mover, the cooling system comprising:

a coolant circuit having:

an evaporator circumferentially disposed around at least part of the electric machine and in thermal communication therewith, the evaporator having a surface heater disposed at least partially around the electric machine and in thermal communication therewith, the surface heater defining heating paths opposite to one another, extending from the lower region of the evaporator to an upper region of the evaporator and circumferentially disposed around at least part of corresponding sides of the electric machine;

a condenser having a surface cooler circumferentially disposed around at least part of the bypass duct and in thermal communication therewith;

a first conduit fluidly connecting an upper region of the evaporator to an upper region of the condenser; and a second conduit fluidly connecting a lower region of the condenser to a lower region of the evaporator; and a coolant fluid in the coolant circuit.

15. The cooling system of claim 14 wherein the coolant circuit has a pumping device in fluid communication therewith, the pumping device being configured for pumping the coolant fluid in the coolant circuit.

16. The cooling system of claim 14 wherein the surface cooler defines coolant paths opposite to one another, extending from the upper region of the condenser to the lower region of the condenser and circumferentially disposed around at least part of corresponding sides of the surface.

* * * * *